US006950291B1

(12) United States Patent
Andres et al.

(10) Patent No.: US 6,950,291 B1
(45) Date of Patent: Sep. 27, 2005

(54) ELECTROMAGNETIC INTERFERENCE SHIELDING FOR SMALL MAGNETIC DEVICES

(75) Inventors: Joao Luiz Andres, Mesquite, TX (US); Michael Ray Bell, Dallas, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,934

(22) Filed: Nov. 29, 1999

(51) Int. Cl.[7] .................................................. H02H 9/00
(52) U.S. Cl. ........................... 361/38; 361/58; 361/118
(58) Field of Search ............................. 361/38, 118, 58

(56) References Cited

U.S. PATENT DOCUMENTS 3,949,290 A * 4/1976 Ochiai et al. ............... 323/368
3,963,975 A * 6/1976 Gauper, Jr. et al. ........... 363/15
4,459,575 A 7/1984 Geissler et al. ........... 336/84 R
5,120,258 A * 6/1992 Carlton ........................ 439/581
5,304,964 A * 4/1994 DiMarco ..................... 333/181

FOREIGN PATENT DOCUMENTS

EP 0 131 700 11/1984
EP 0 190 930 1/1987
JP 63002306 7/1988
JP 04297008 9/1993

* cited by examiner

*Primary Examiner*—Stephen W. Jackson

(57) ABSTRACT

The present invention provides magnetic structure, particularly an isolation transformer, which includes a shield to prevent radiation of electromagnetic interference ("EMI"). The magnetic structure includes a support structure, or bobbin, on which are mounted windings formed from electrical conductors. The windings are electrically connected to termination points, which provide the electrical interconnections for the magnetic structure. A magnetic core can be included in the support structure to provide optimal magnetic properties to the device. An EMI shield formed from a metallic foil such as copper is wrapped around the winding to prevent the radiation of EMI. The EMI shield is connected to a shield pin in the support structure by a conductive strap such that the shield pin is electrically connectable to a fixed potential through a safety rated capacitor to provide a low impedance path for currents induced in the EMI shield. The magnetic structure is particularly useful as an isolation transformer in an isolated power supply.

10 Claims, 2 Drawing Sheets

ELECTROMAGNETIC INTERFERENCE SHIELDING FOR SMALL MAGNETIC DEVICES

TECHNICAL FIELD OF THE INVENTION

The present invention relates to small magnetic devices such as transformers. Specifically, the present invention relates to electromagnetic interference (EMI) shielding for such devices.

BACKGROUND OF THE INVENTION

Magnetic devices, such as inductors and transformers, are employed in many different types of electrical devices including communications equipment and power supplies. In practice, most magnetic devices are fabricated of one or more windings, formed by an elongated electrical conductor, such as a wire of circular or rectangular cross-section, or a planar electrical conductor wound about or mounted to a bobbin composed of a dielectric material, such as plastic. In some instances, the electrical member is soldered to terminations on the bobbin. Alternatively, the electrical member may be threaded through the bobbin for connection directly to a metallized area of an underlying circuit board. A magnetic core may be disposed about the bobbin to impart a greater reactance to the magnetic device and thereby alter its operating characteristics.

As stated, transformers and inductors are very important components of switch-mode power supplies, i.e. power supplies that use switches to regulate an output voltage to account for variations in input and load conditions. Switch-mode power supplies, by nature of their operation and components can often generate a great deal of EMI. EMI can radiate from the power equipment and impair the function of other electrical equipment. Magnetic components, particularly transformers, are often major sources of EMI. Shielding such components can greatly reduce the EMI emitted by the component, however, such shielding must take safety regulations in mind.

A conductive strap can be wrapped around a power transformer to reduce the effects of stray magnetic fields around the core, which can cause both radiated and conducted EMI. For safety reasons the magnetic core is left floating, i.e. not at a defined potential, which allows equal spacing between the core and primary windings, and between the core and the secondary windings. The drawback to leaving the core floating is that the windings can capacitively couple to the core through the parasitic capacitance that exists between the windings and the core. The capacitive coupling can be further increased by the proximity of the conductive strap to the outermost windings. Additionally, if the power transformer is close to other components, the magnetic core may couple to them, creating common mode currents that can cause EMI.

Accordingly, what is needed is a shield for small magnetic structures that would keep the magnetic core at a fixed potential while electrically isolating it from the primary and secondary sides of the circuit.

SUMMARY OF THE INVENTION

The present invention provides for magnetic structures, particularly isolation transformers, which are shielded from radiating EMI. The magnetic structure includes a support structure on which are mounted the windings which form the electrical component. The windings terminate on termination pins mounted in the support structure. A magnetic core can be mounted in the support structure around the windings to optimize the magnetic properties of the electrical component.

An EMI shield is wrapped around at least a portion of the magnetic core and the windings to provide shielding against stray magnetic fields that can cause radiated or conducted EMI. The EMI shield can be formed from copper foil or any other suitable conductive material. The EMI shield is electrically connected to a shield pin mounted in the support structure through a conductive strap that is soldered to the EMI shield. When the magnetic structure is mounted on a printed wiring board in an electrical circuit the shield pin is connected to a fixed potential preferably on the secondary side of the transformer, through a safety rated capacitor. The safety rated capacitor provides a low impedance path for higher frequency noise while providing enough impedance at the lower switching frequency of the power supply to maintain the electrical isolation between the EMI shield and the fixed potential.

Also as part of the present invention, a power supply is presented that incorporates an isolation transformer with EMI shielding. The power supply can be either an ac-to-dc, or a dc-to-dc power supply and includes an input power stage and an output power stage. The input power stage and the output power stage are coupled together and electrically isolated by an isolation transformer constructed as described above and having its EMI shield electrically connected to the ground plane of the output power stage through a safety rated capacitor connected to the shield pin.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1A:
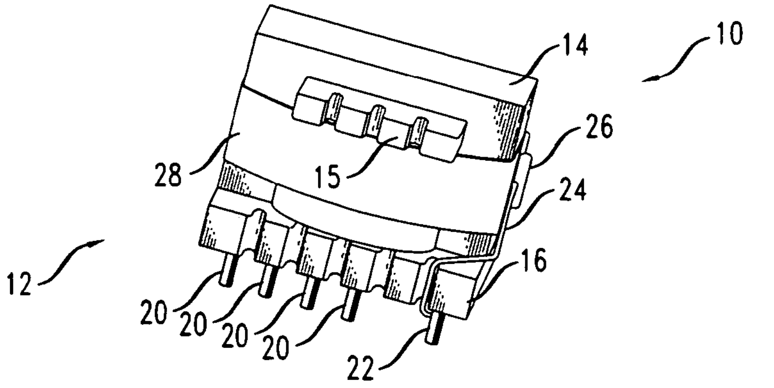
FIG. 1A is a perspective view showing a magnetic structure with an EMI shield in accordance with the principles of the present invention.
Figure 1B:
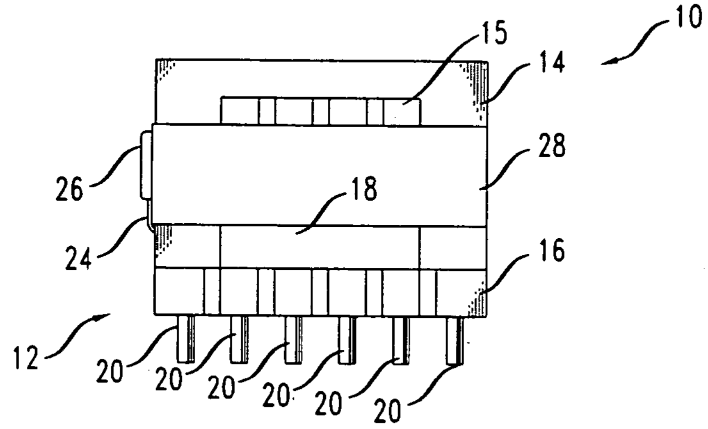
FIG. 1B is a side view of the magnetic structure from FIG. 1A.
Figure 1C:
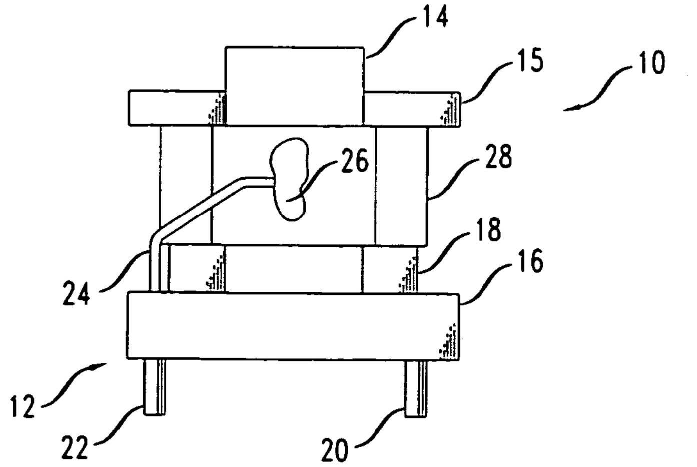
FIG. 1C is an end view of the magnetic structure from FIG. 1A.
Figure 1D:
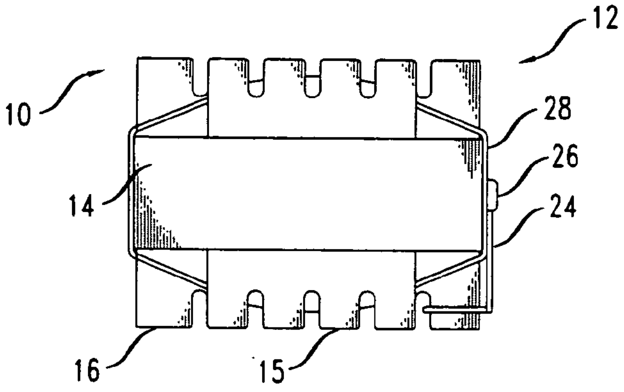
FIG. 1D is a top view of the magnetic structure from FIG. 1A.

Referring now to FIGS. 1A through 1D, a magnetic structure according to the present invention is shown. Magnetic structure 10, which can be a transformer, is a discrete electrical component suitable for mounting on a printed wiring board either by through hole or surface mounting techniques. Magnetic structure 10 is formed by a support structure, shown here as bobbin 12, which includes an integrally formed winding spool 15, and termination block 16. Winding spool 15 of bobbin 12 holds windings 18 which form the individual primary and secondary windings of a transformer or the windings for an inductor as appropriate for the specific magnetic structure 10. Termination block 16 of bobbin 12 holds terminations pins 20, which provide both the electrical interconnection to individual windings 18 and to the printed wiring board (not shown). A magnetic core 14 can be fitted around bobbin 12 to provide a path for the magnetic flux generated when current flows through windings 18. Magnetic core 14 allows the magnetic properties of magnetic structure 10 to be optimized.

As stated, magnetic components such as magnetic structure 10 tend to generate large amounts of EMI under normal operating conditions. In order to reduce the amount of radiated EMI, EMI shield 28 is wrapped around at least a portion of the magnetic core 14, and windings 18, as required. EMI shield can be formed from any suitable conductive material, such as copper or aluminum foil. Normally the individual conductors forming windings 18 will be coated in an insulating material providing electrical insulation between windings 18 and EMI shield 28. However, if windings 18 are not insulated, EMI shield 28 can be coated in an insulating material or an insulating material can be wrapped around windings 18 before EMI shield 28 to specifically insulate EMI shield 28 from windings 18.

Strap 24, which can be any suitable electrical conductor such as copper wire, is used to connect EMI shield 28 to shield pin 22. Strap 24 is shown connected to EMI shield 28 by solder joint 26, although one skilled in the art would understand that any type of connection that insures good electrical contact could be used. Strap 24 connects to shield pin 22 by wrapping around shield pin 22 or by being directly soldered to shield pin 22 as long as good electrical connection is made. Shield pin 22 provides the connection between EMI shield 28 and the appropriate ground plane on the printed wiring board to which magnetic structure 10 is connected. Shield pin 22 must maintain the proper spacing and creepage requirements between it and termination pins 20 in order to meet established safety regulations.

Figure 2:
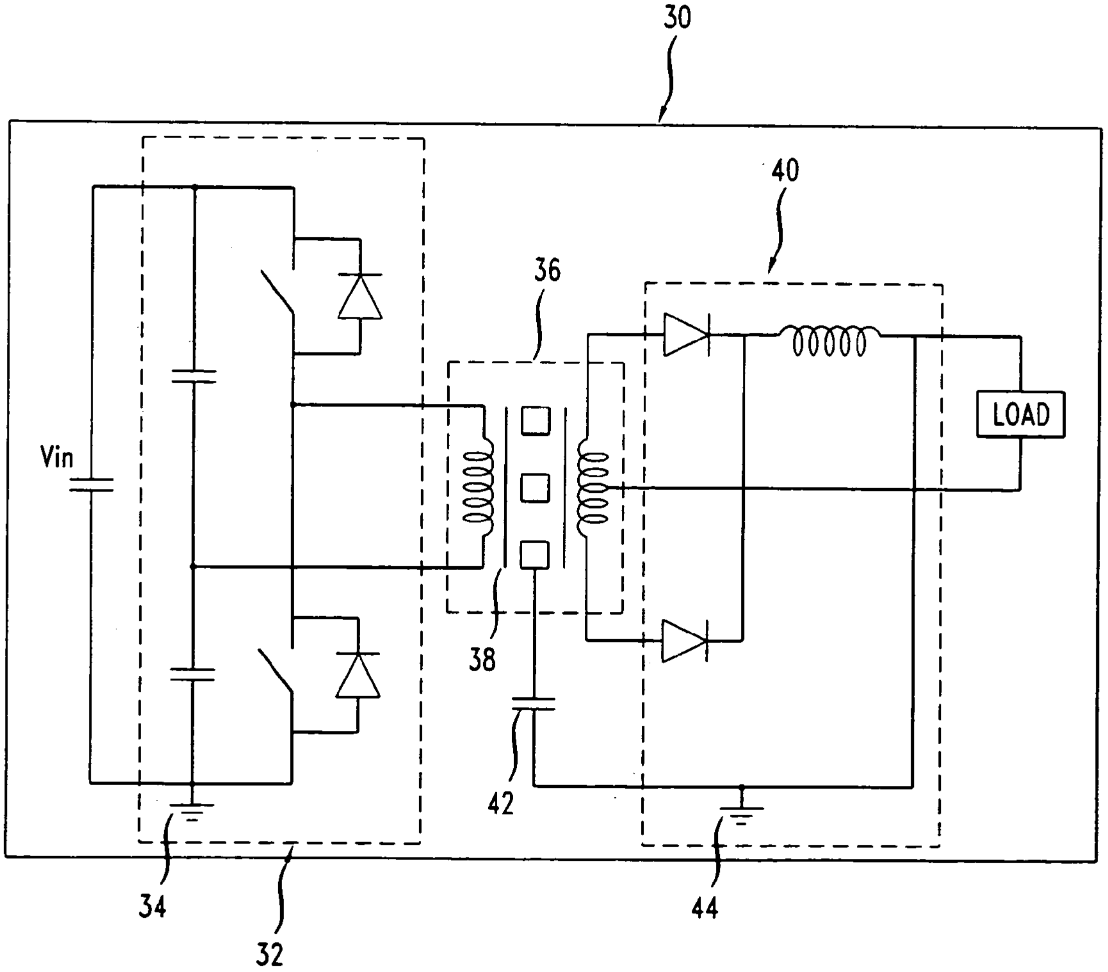
FIG. 2 is a circuit diagram incorporating the magnetic structure in accordance with the principles of the present invention.

Referring now to FIG. 2, a circuit diagram of a power converter 30 is shown incorporating the principles of the present invention. Power converter 30 is an isolated power converter having an input, or primary, stage 32 isolated from an output, or secondary, stage 40 by isolation transformer 36. Isolation transformer 36 is constructed according to the principles set forth with respect to FIGS. 1A through 1D. Although power converter 30 is shown as a particular dc-to-dc converter topology with input voltage $V_{in}$, one skilled in the art would understand that this is for illustration only and that any type of ac-to-dc, or dc-to-dc converter topology which utilizes an isolation transformer could be substituted in FIG. 2 without departing from the scope of the present invention.

As with any isolated power converter, power converter 10 has its input stage 32 connected to a primary ground 34 while its output stage is connected to a secondary ground 44. In order to meet safety requirements, isolation transformer 36 has its shield pin 22, from FIGS. 1A, B, C, and D, connected to node 38 which is connected to a fixed potential preferably on the secondary side of isolation transformer 36, which can be secondary ground 44, through safety rated, or single insulated, capacitor 42. Capacitor 42 provides a low impedance circuit path for the high frequency currents induced in EMI shield 42, while maintaining the required isolation between EMI shield 28 from FIGS. 1A, B, C, and D and the fixed potential, which can be secondary ground 44, by providing a high impedance for the lower frequency switching signal passed across the isolation transformer. A fixed potential on the secondary side of isolation transformer 36, for example secondary ground 44, is used for connection to capacitor 42 in order to avoid the more costly double insulated wire and special bobbins which could be required to connect to the primary side in order to maintain safety and spacing requirements.

All of the elements shown in FIGS. 1A through D and 2 are commonly available. Although particular references have been made to specific structures, topologies and materials, those skilled in the art should understand that magnetic structure 10 could be formed in a multitude of shapes and sizes, all of which are well within the broad scope of the present invention.

Although the present invention has been described in detail, those skilled in the art should understand that they can make various changes, substitutions and alterations herein without departing from the spirit and scope of the invention in its broadest form.

We claim:

1. A board mountable transformer comprising:

a support structure;

a primary and a secondary winding wound on the support structure;

termination points mounted in the support structure, wherein at least some of the termination points provide electrical connection to the primary and secondary windings;

an electromagnetic shield wrapped around the winding and electrically connected to one of the termination points not connected to the primary or secondary windings, wherein the electromagnetic shield is electrically connectable to a fixed potential through a safety rated capacitor.

2. The board mountable transformer structure of claim 1 wherein the fixed potential is a secondary ground.

3. The board mountable transformer of claim 1 wherein the electromagnetic shield is electrically connected to the termination point by a conductive strap soldered to the electromagnetic shield.

4. The board mountable transformer of claim 1 further comprising a magnetic core held by the support structure.

5. The board mountable transformer of claim 1 wherein the safety rated capacitor is connected between secondary ground of a printed circuit board and the termination pin connected to the electromagnetic shield.

6. A method of shielding a magnetic structure from radiating electromagnetic interference, the magnetic structure having a support structure, a magnetic core mounted in the support structure, windings mounted on the support structure, and termination points electrically connected to the windings and mounted in the support structure, the method comprising:

at least partially enclosing the magnetic core with an electromagnetic shield;

connecting the electromagnetic shield to a shield pin mounted in the support structure using a conductive strap; and connecting the shield pin to a fixed voltage through a safety rated capacitor.

7. The method of claim 6 wherein the fixed voltage is a secondary ground plane.

8. The method of claim 6 wherein the electromagnetic shield is formed from copper foil.

9. The method of claim 6 wherein the magnetic structure is an isolation transformer used in a power supply.

10. The method of claim 6 wherein the shield pin is separated from the termination pins in order to maintain safety spacing and creepage requirements.

* * * * *